US012718214B2

(12) United States Patent
Singh

(10) Patent No.: US 12,718,214 B2
(45) Date of Patent: Aug. 25, 2026

(54) LEVERAGING SPATIAL COMPUTING FOR SECURE MULTI-EVENT POINT-OF-SALE DEVICE INTERACTION

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 91 days.

(21) Appl. No.: 18/623,234

(22) Filed: Apr. 1, 2024

(65) Prior Publication Data

US 2025/0307793 A1 Oct. 2, 2025

(51) Int. Cl.
*G06Q 20/00* (2012.01)
*G06Q 20/20* (2012.01)
*G06Q 20/38* (2012.01)

(52) U.S. Cl.
CPC .......... *G06Q 20/20* (2013.01); *G06Q 20/389* (2013.01)

(58) Field of Classification Search
CPC ............................ G06Q 20/20; G06Q 20/389
See application file for complete search history.

(56) References Cited

U.S. PATENT DOCUMENTS 10,510,054 B1 12/2019 Eidam et al.
10,586,100 B2 3/2020 Wang et al.
11,037,116 B2 6/2021 Sinha et al.
11,204,648 B2 12/2021 Friedman et al.
11,282,327 B2 3/2022 Zhang et al.
11,803,837 B2 10/2023 Singh
11,836,566 B2 12/2023 Chen et al.
12,321,944 B2 6/2025 Townsend et al.
2008/0114699 A1* 5/2008 Yuan .................... G06Q 20/327 705/17
2017/0024720 A1* 1/2017 Shah .................... G06Q 20/227
2017/0262836 A1* 9/2017 Mcguinness ......... G06Q 20/405
2018/0276652 A1 9/2018 Sofronas (Continued)

OTHER PUBLICATIONS

Sep. 11, 2025—(US) Non-Final Office Action—U.S. Appl. No. 18/623,205.

(Continued)

*Primary Examiner* — Rokib Masud
(74) *Attorney, Agent, or Firm* — Banner & Witcoff, Ltd.

(57) ABSTRACT

Arrangements for securely processing events via a point-of-sale system are provided. A computing platform may receive, from a spatial computing device within a predefined proximity of a point-of-sale device, an indication of detection of the point-of-sale device and a communication session between the spatial computing device and point-of-sale device may be initiated. Transaction details may be rendered on a display of the spatial computing device. A user may tap a plurality of payment cards to the spatial computing device and identify portions of the transaction to process with each payment card. In response, a digital payment device corresponding to each payment card may be generated. The generated digital payment devices may be transmitted to the point-of-sale system which may cause the point-of-sale system to process each portion of the transaction with a payment processing entity associated with a corresponding payment card and using the corresponding digital payment device.

20 Claims, 12 Drawing Sheets

(56) References Cited

U.S. PATENT DOCUMENTS

| | | | | |
|---|---|---|---|---|
| 2023/0394542 | A1* | 12/2023 | Gabriele | G06Q 30/0623 |
| 2024/0046245 | A1* | 2/2024 | Neale | G06K 1/128 |
| 2024/0078529 | A1* | 3/2024 | Maeng | G06Q 20/204 |

OTHER PUBLICATIONS

Jan. 22, 2026—(US) Final Office Action—U.S. Appl. No. 18/623,205.

* cited by examiner

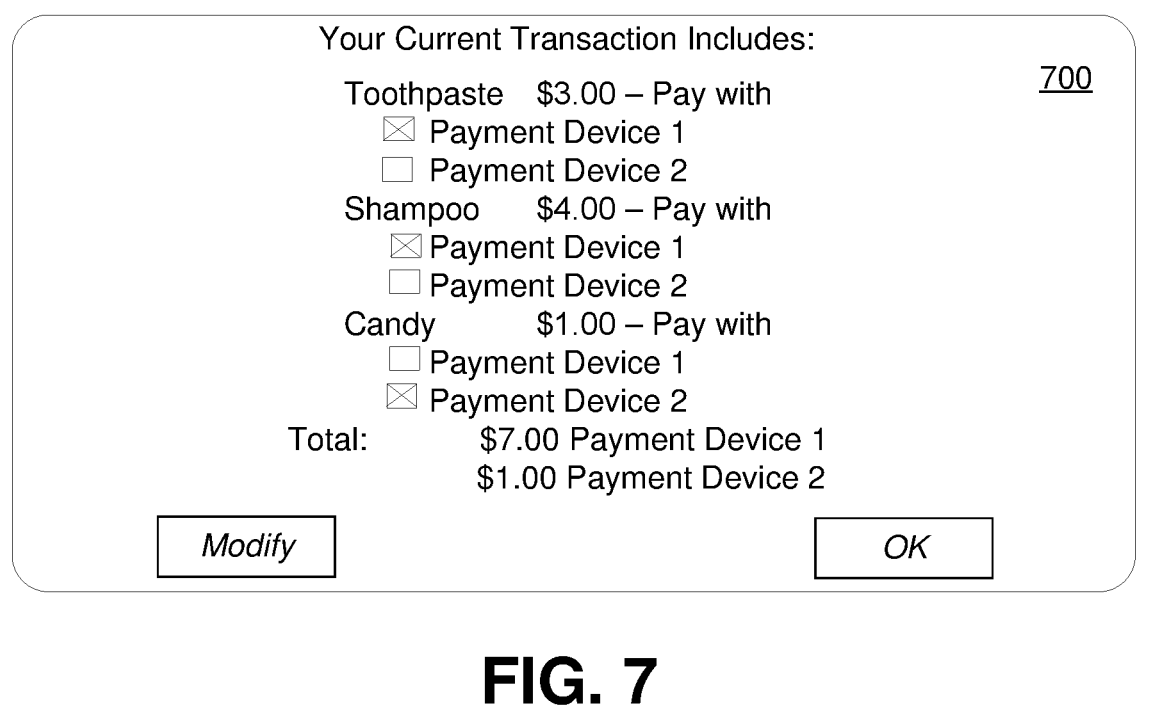

Your Current Transaction Includes:

700

Toothpaste $3.00 – Pay with
☒ Payment Device 1
☐ Payment Device 2
Shampoo $4.00 – Pay with
☒ Payment Device 1
☐ Payment Device 2
Candy $1.00 – Pay with
☐ Payment Device 1
☒ Payment Device 2
Total: $7.00 Payment Device 1
$1.00 Payment Device 2

*Modify* *OK*

FIG. 7

LEVERAGING SPATIAL COMPUTING FOR SECURE MULTI-EVENT POINT-OF-SALE DEVICE INTERACTION

BACKGROUND

Aspects of the disclosure relate to electrical computers, systems, and devices for leveraging spatial computing to provide secure interactions with point-of-sale devices.

Payment devices such as credit cards, debit cards, and the like, are frequently used to process transactions at a variety of entities. However, as a user interacts with a point-of-sale device (e.g., by swiping a card, tapping a card or inserting a card), a compromised point-of-sale device may capture user or payment data that may then be used by unauthorized actors. For instance, a skimmer device may be installed on a point-of-sale device by unauthorized actors and may be used to capture user and/or payment data when a user executes a transaction at the point-of-sale device. Accordingly, it would be advantageous to provide arrangements for a user initiating a transaction through interaction between a payment card and personal computing device, such as a spatial computing device, that may mimic a point-of-sale device at the location.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with securely processing events via a point-of-sale system.

In some examples, a computing platform may receive, from a spatial computing device within a predefined proximity of a point-of-sale device, an indication of detection of the point-of-sale device. In response, a communication session between the spatial computing device and point-of-sale device may be initiated. In some examples, transaction details such as items purchased, total amount of purchase, and the like, may be rendered on a display of the spatial computing device. The user may approve the transaction via user input captured via the spatial computing device and the computing platform may receive the approval.

A user may tap or otherwise provide contactless interaction between a plurality of payment card devices, such as debit or credit cards, to the spatial computing device. The user may also provide input identifying portions of the transaction to process with each payment card device of the plurality of payment card devices. In response, spatial computing device and/or computing platform may generate a digital payment device corresponding to each physical payment card device of the plurality of payment card devices based on payment details extracted from each payment card device (e.g., account number, expiration date, CVV, or the like). The generated digital payment devices may be transmitted to the point-of-sale system which may cause the point-of-sale system to process each portion of the transaction with a payment processing entity associated with a corresponding payment card device and using the corresponding digital payment device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5-7 illustrate example graphical user interfaces that may be generated in accordance with one or more aspects described herein.

DETAILED DESCRIPTION

Figure 1A:
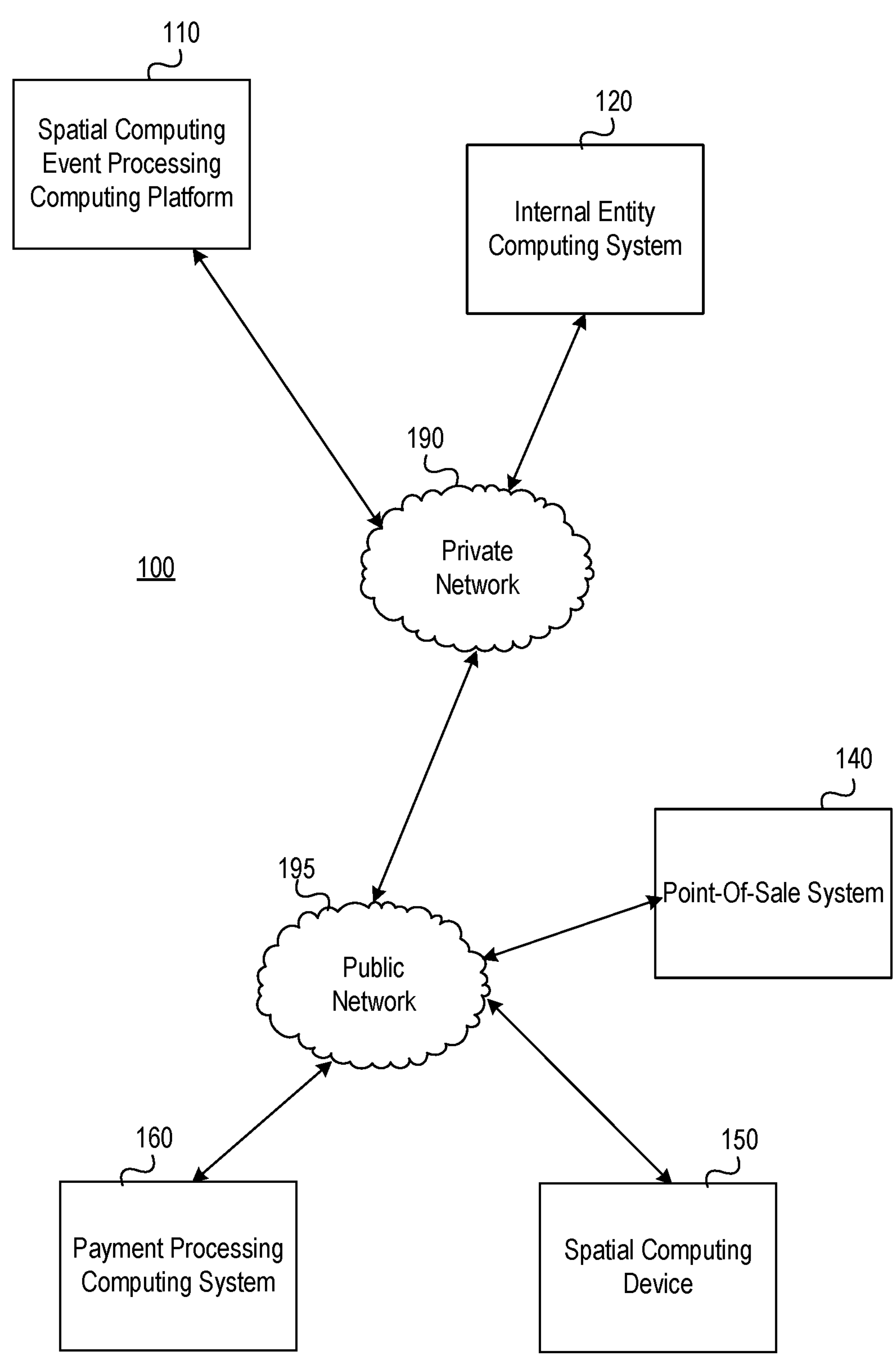
FIGS. 1A-1B depict an illustrative computing environment for leveraging spatial computing to provide secure point-of-sale interaction in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, interactions between user payment card devices, such as debit cards or credit cards, and point-of-sale devices may be susceptible to unauthorized users capturing user and/or payment data without user permission. Accordingly, aspects described herein rely on interactions between a payment card device and a spatial computing device of a user to initiate the transaction to avoid or eliminate direct communication or contact between a payment card device and a potentially compromised point-of-sale system.

For instance, a user may approach a point-of-sale device to initiate a transaction (e.g., a purchase, or the like). In some examples, a near-field communication session may be established between the point-of-sale system and a spatial computing device of the user. A rendering of the transaction details (e.g., items being purchased, associated amounts, and the like) may be displayed by a display of the spatial computing device (e.g., the spatial computing device may mimic the point-of-sale device). In some examples, a user may validate the transaction details through the use of one or more gestures captured by the spatial computing device.

In some examples, a user may tap the user's payment card device (e.g., radio frequency identification, near-field communication, or the like may be used to initiate a payment via the payment device) to the spatial computing device (e.g., rather than the point-of-sale system) in a contactless process to initiate payment. The spatial computing device or computing platform associated therewith may generate a digital payment device or card based on the payment details of the physical payment card device (e.g., account number, expiration data, CVV, or the like). The digital payment device or card may then be transmitted by the spatial computing device or computing platform to the point-of-sale system which may cause the point-of-sale system to initiate processing of the transaction with a payment processing entity (e.g., financial institution associated with the payment device, or the like).

In some examples, a user may use multiple payment card devices to complete the transaction. For instance, a user may tap a plurality of payment card devices and each payment device tapped may be converted to a digital payment device. The user may then use gestures captured by the spatial computing device to indicate a portion of the transaction to be processed via each payment card device of the plurality of payment card devices. The digital payment devices may then be transmitted by the spatial computing device to the point-of-sale system causing the point-of-sale system to initiate transaction processing with payment processing entities associated with each payment card device used in the transaction.

These and various other arrangements will be discussed more fully below.

Figure 1B:
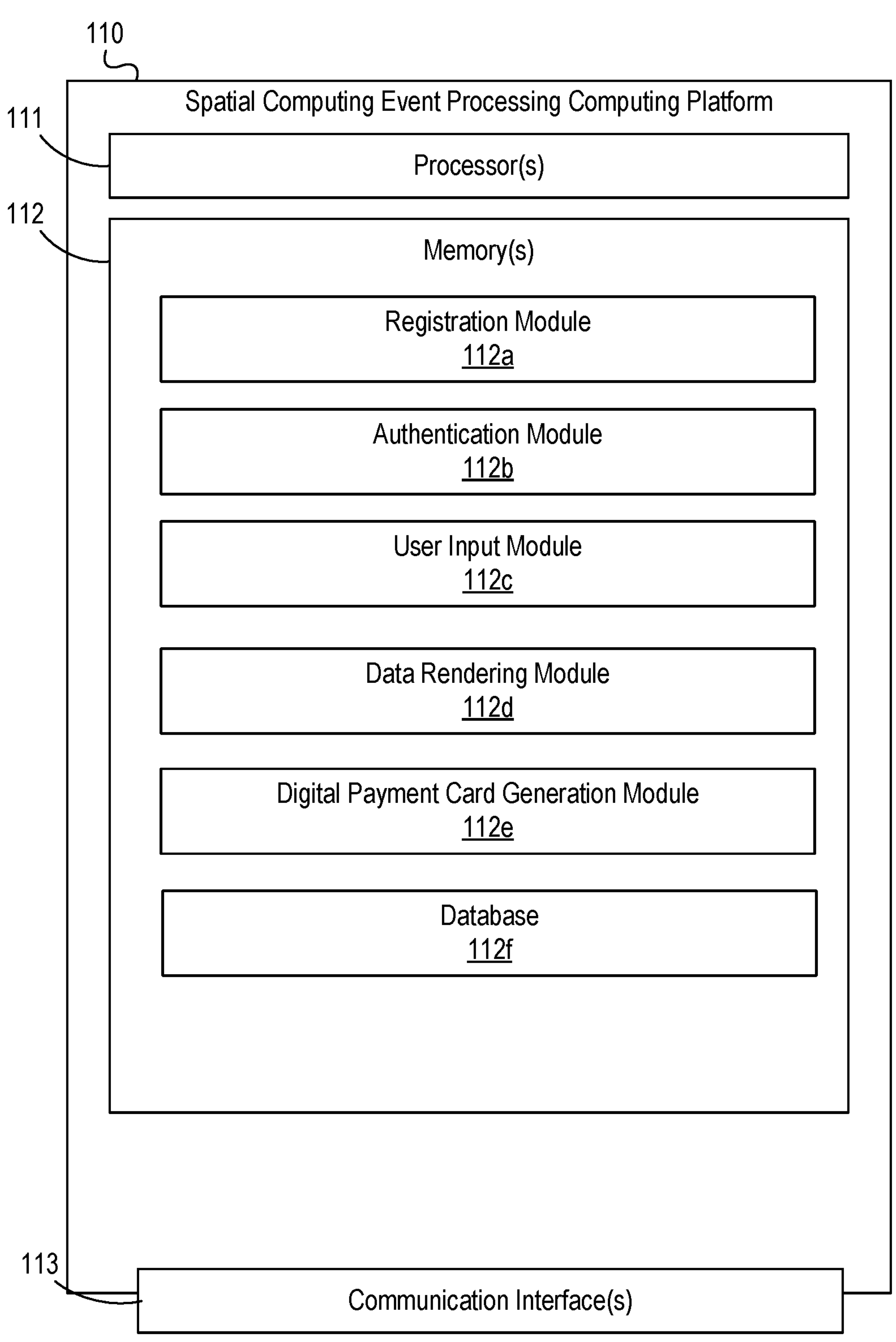

FIGS. 1A-1B depict an illustrative computing environment for leveraging spatial computing for secure point-of-sale device interaction in accordance with one or more aspects described herein. Referring to FIG. 1A, computing environment 100 may include one or more computing devices and/or other computing systems. For example, computing environment 100 may include spatial computing event processing computing platform 110, internal entity computing system 120, point-of-sale system 140, spatial computing device 150 and payment processing computing system 160. Although one internal entity computing system 120, one point-of-sale system 140, one spatial computing device 150 and one payment processing computing system 160 are shown, any number of devices or systems may be used without departing from the invention.

Spatial computing event processing computing platform 110 may be or include one or more computing devices (e.g., servers, server blades, or the like) and/or one or more computing components (e.g., memory, processor, and the like) and may be configured to provide dynamic, efficient, intelligent spatial computing event processing functions. In some examples, spatial computing event processing computing platform 110 may part of a same device as the spatial computing device 150, in communication with spatial computing device 150, or the like. Accordingly, processes described as performed by the spatial computing device event processing computing platform 110 may be performed by spatial computing device 150 and vice versa.

Spatial computing event processing computing platform 110 may detect a proximity to a point-of-sale system, such as point-of-sale system 140 at an entity location (e.g., via the spatial computing device 150 associated with a user present at a location of the point-of-sale system 140). In response, a communication session may be initiated between the spatial computing device 150 and/or the spatial computing event processing computing platform 110 and the point-of-sale system 140. In some examples, the communication session may use near-field communication.

The spatial computing event processing computing platform 110 may request transaction processing via the point-of-sale system. In response, transaction details associated with the requested transaction may be rendered on a display of spatial computing device 150. The transaction details may include items being purchased, an amount or cost associated with each item being purchased, a total amount of the purchase, and the like.

In some examples, the spatial computing device 150 may capture one or more gestures of a user used to indicate that the purchase is valid or to authorize processing of the event or transaction. The user may tap the user's physical payment card device to the spatial computing device 150 which may cause spatial computing event processing computing platform 110 to extract payment card device details and generate a digital payment device or card. The digital payment device may be transmitted to the point-of-sale system 140 which may cause the point-of-sale system 140 to initiate transaction processing with a payment processing entity associated with the payment device.

In some examples, a user may tap a plurality of payment card devices and digital payment devices may be generated for each payment device tapped. The user may then indicate, via gestures captured by the spatial computing device 150, a portion of the transaction to be processed with each payment card device. The digital payment devices may then be transmitted to the point-of-sale system 140 to initiate payment processing with payment processing entities associated with each payment card device.

Internal entity computing system 120 may be or include one or more computing devices (e.g., servers, server blades, or the like) and/or one or more computing components (e.g., memory, processor, and the like) and may be configured to host or execute one or more enterprise organization applications. For instance, internal entity computing system 120 may host applications associated with processing transactions, authenticating a user, providing access to user data, updating or modifying an account ledger based on executed transactions, and the like.

Point-of-sale system 140 may be or include one or more computing devices (e.g., servers, server blades, or the like) and/or one or more computing components (e.g., memory, processor, and the like) and may be configured to process one or more transactions at an entity location. For instance, point-of-sale system 140 may be configured to read a payment card device (e.g., via a magnetic strip from which data is captured during a swipe operation, from a chip embedded in the payment card device captured when the payment card device is inserted into the point-of-sale system 140, via RFID when a contactless payment card device is tapped or hovers over the point-of-sale system 140) to capture payment information used to process a transaction (e.g., account number, expiration date, and the like).

Spatial computing device 150 may be or include one or more spatial computing devices that bring together virtual and physical worlds. For instance, spatial computing device 150 may be virtual reality, augmented reality and/or mixed reality devices and may include wearable devices such as goggles or glasses. Accordingly, as a user views their surroundings through the spatial computing device 150, the display may include objects within the user's physical environment as well as virtual objects, overlays, user interfaces, or the like, rendered by a display of the spatial computing device 150. In some examples, spatial computing device 150 may be used to render an invoice or other transaction details associated with a transaction, display requested portions of transactions for processing with different payment card devices, or the like. Spatial computing device 150 may also capture user input through, for instance, gestures, to enable the user to select, highlight, choose, or the like, items from a display of the spatial computing device 150. Spatial computing device 150 may further be configured to capture payment card device data, communicate with and/or connect to a point-of-sale system 140, or the like through, for instance, RFID, NFC, or the like.

Payment processing computing system 160 be or include one or more computing devices (e.g., servers, server blades, or the like) and/or one or more computing components (e.g., memory, processor, and the like) and may be configured to process one or more requests for payment via one or more payment card devices. For instance, payment processing computing system 160 may connect to and/or communicate with point-of-sale system 140 to receive digital payment device data and process transactions and/or portions of transactions using the digital payment device data.

As mentioned above, computing environment 100 also may include one or more networks, which may interconnect one or more of spatial computing event processing computing platform 110, internal entity computing system 120, point-of-sale system 140, spatial computing device 150 and/or payment processing computing system 160. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, spatial computing event processing computing platform 110 and/or internal entity computing system 120 may be associated with an enterprise organization (e.g., a financial institution), and private network 190 may be associated with and/or operated by the organization, and may include one or more networks (e.g., LANs, WANs, virtual private networks (VPNs), or the like) that interconnect spatial computing event processing computing platform 110 and/or internal entity computing system 120 and one or more other computing devices and/or computer systems that are used by, operated by, and/or otherwise associated with the organization. Public network 195 may connect private network 190 and/or one or more computing devices connected thereto (e.g., spatial computing event processing computing platform 110, internal entity computing system 120) with one or more networks and/or computing devices that are not associated with the organization. For example, point-of-sale system 140, spatial computing device 150 and/or payment processing computing system 160 might not be associated with an organization that operates private network 190 (e.g., because point-of-sale system 140, spatial computing device 150 and/or payment processing computing system 160 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect point-of-sale system 140, spatial computing device 150 and/or payment processing computing system 160 to private network 190 and/or one or more computing devices connected thereto (e.g., spatial computing event processing computing platform 110 and/or internal entity computing system 120).

Referring to FIG. 1B, spatial computing event processing computing platform 110 may include one or more processors 111, memory 112, and communication interface 113. A data bus may interconnect processor(s) 111, memory 112, and communication interface 113.

Communication interface 113 may be a network interface configured to support communication between spatial computing event processing computing platform 110 and one or more networks (e.g., network 190, network 195, or the like). Memory 112 may include one or more program modules having instructions that when executed by processor(s) 111 cause spatial computing event processing computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of spatial computing event processing computing platform 110 and/or by different computing devices that may form and/or otherwise make up spatial computing event processing computing platform 110.

For example, memory 112 may have, store and/or include registration module **112*a*. Registration module 112*a* may store instructions and/or data that may cause or enable the spatial computing event processing computing platform 110 to receive a request to register a user and/or spatial computing device (e.g., spatial computing device 150, or the like). In some examples, the request may be received from the spatial computing device 150. Additionally or alternatively, the request may be received from another user computing device and may provide registration information associated with the spatial computing device 150**, or the like. The registration data may include user identifying data, spatial computing device identifying data, user account data, user payment card device data, user authentication data (e.g., username and password, biometric data, or the like), and the like.

Spatial computing event processing computing platform 110 may further have, store and/or include authentication module **112*b*. Authentication module 112*b* may store instructions and/or data that may cause or enable the spatial computing event processing computing platform 110 to receive, from a spatial computing device 150, a detection of a point-of-sale system 140 (e.g., based on proximity of the spatial computing device 150 to the point-of-sale system 140), and, in response, may confirm that the spatial computing device 150 is a registered computing device and that the user is authenticated (e.g., user had provided authentication data for comparison to pre-stored data). In some example, iris or retina data may be captured via the spatial computing device 150 and transmitted to the spatial computing event processing computing platform 110 with the indication of detection of the point-of-sale system 140. Pre-stored retina or iris data may be retrieved (e.g., from internal entity computing system 120**) and compared to the captured/received iris or retina data to confirm that the user is authenticated. If the user is not authenticated, no further action may be taken. If the user is authenticated, the transaction or event processing functionality may proceed.

Spatial computing event processing computing platform 110 may further have, store and/or include user input module **112*c*. User input module 112*c* may store instructions and/or data that may cause or enable the spatial computing event processing computing platform 110 to receive user input data captured by spatial computing device 150**, process the user input and generate and transmit instructions based on the user input. In some examples, the user input captured may include user gestures (e.g., with hands, arms, eyes, or the like).

Spatial computing event processing computing platform 110 ma further have, store and/or include data rendering module 112*d*. Data rendering module 112*d* may store instructions and/or data that may cause or enable the spatial computing event processing computing platform 110 to generate and transmit instructions causing one or more interfaces to be rendered by a display of the spatial computing device 150. For instance, data from the point-of-sale system (e.g., transaction details, list of items purchased, costs, or the like) may be mimicked by the display of the spatial computing device 150 based on instructions received by the spatial computing device 150 from the data rendering module 112*d*. The data rendering module 112*d* may cause additional virtual objects to appear with the mimicked point-of-sale system 140 data, such as options to approve the purchase, options to split the purchase between multiple payment cards, or the like.

Spatial computing event processing computing platform 110 may further have, store and/or include digital payment card or device generation module 112*e*. Digital payment card generation module 112*e* may store instructions and/or data that may cause or enable the spatial computing event processing computing platform 110 to receive payment card device data (e.g., from physical payment card device(s) such as debit cards, credit cards, and the like) and generate digital payment cards corresponding to the received payment card device data. In some examples, data from multiple payment card devices may be received and multiple digital payment cards may be generated, each corresponding to a physical payment card device.

Spatial computing event processing computing platform 110 may further have, store and/or include database 112*f*. Database 112*f* may store data related to user and/or device registration, data renderings, digital payment cards generated and/or other data that enables performance of aspects described herein by the spatial computing event processing computing platform 110.

FIGS. 2A-2E depict one example illustrative event sequence for leveraging spatial computing for secure interaction between one or more payment card devices and a point-of-sale device in accordance with one or more aspects described herein. The events shown in the illustrative event sequence are merely one example sequence and additional events may be added, or events may be omitted, without departing from the invention. Further, one or more processes discussed with respect to FIGS. 2A-2E may be performed in real-time or near real-time.

Figure 2A:
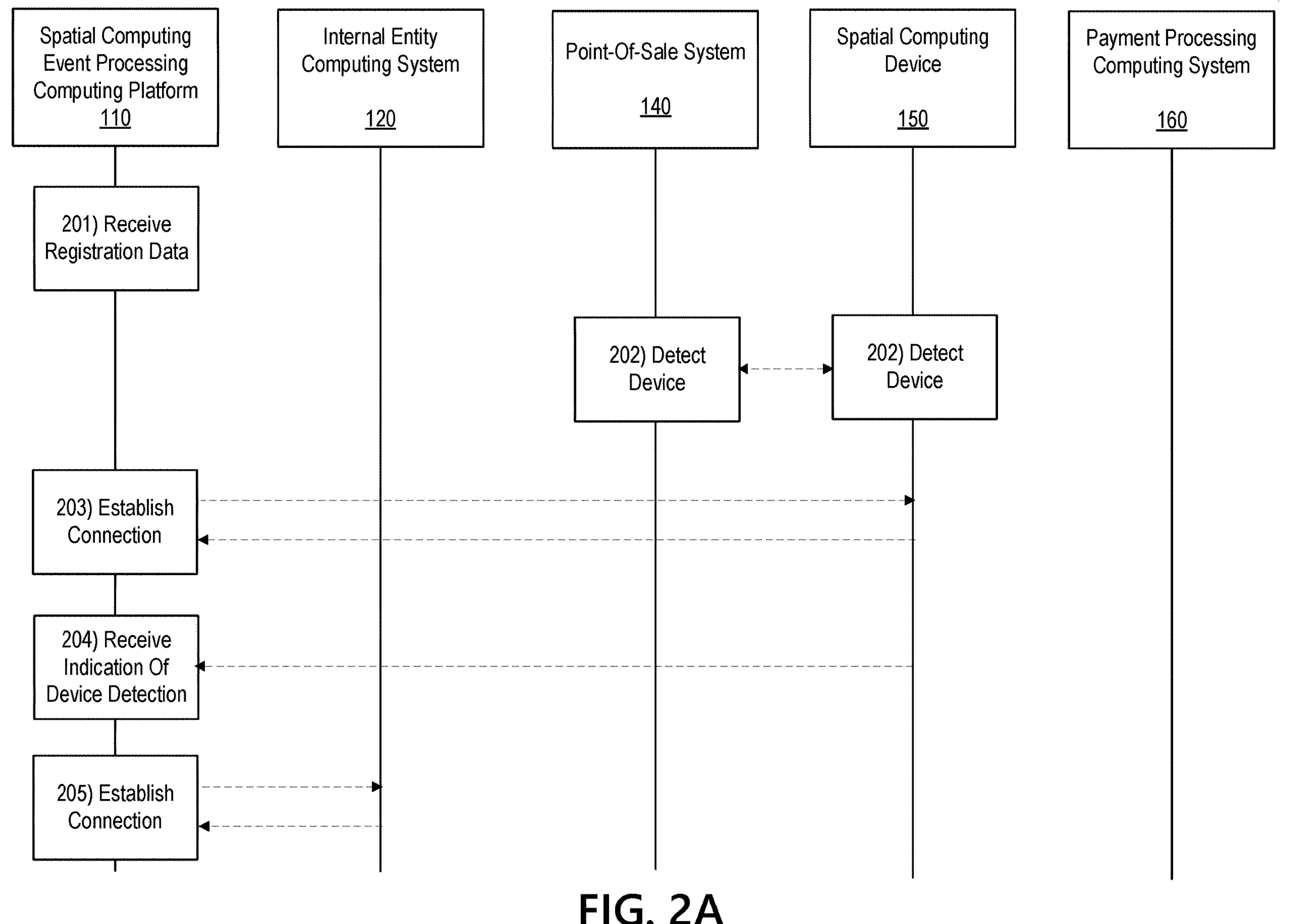
FIGS. 2A-2E depict an illustrative event sequence for leveraging spatial computing to provide secure point-of-sale interaction in accordance with one or more aspects described herein.

With reference to FIG. 2A, at step 201, spatial computing event processing computing platform 110 may receive registration data. For instance, a user may request to register with the spatial computing event processing computing platform 110 and may transmit a request to the spatial computing event processing computing platform 110. The registration request may include registration data such as a user identifier, identifying data associated with one or more spatial computing devices of the user, payment card information, user authentication data (e.g., biometric data such as retina or iris scan data, fingerprint data, or the like, username and password, personal identification number, or the like), or the like. The registration data may be stored in a database. In some examples, user authentication data and/or spatial computing device 150 identifying data may be stored by internal entity computing system 120 (e.g., authentication data may be used in other scenarios to authenticate the user).

At step 202, a spatial computing device 150 may detect a point-of-sale system 140. For instance, as a user wearing or otherwise using spatial computing device 150 approaching the point-of-sale system 140, the spatial computing device 150 may detect the point-of-sale system 140 based on, for instance, near-field communication or other short-range communication protocol. In some examples, a signal may be emitted from one or more of point-of-sale system 140 and/or spatial computing device 150 that may be detected by the other device upon the devices being within a predetermined range or distance of each other.

Upon detection of the point-of-sale system, at step 203, spatial computing event processing computing platform 110 may establish a connection with spatial computing device 150. For instance, spatial computing event processing computing platform 110 may establish a first wireless connection with spatial computing device 150. Upon establishing the first wireless connection, a communication session may be initiated between spatial computing event processing computing platform 110 and spatial computing device 150.

At step 204, the spatial computing event processing computing platform 110 may receive an indication of detection of the point-of-sale system 140 by the spatial computing device 150 and from the spatial computing device. In some examples, the indication may be received during the communication session initiated upon establishing the first wireless connection. In some examples, the indication may include data identifying the spatial computing device 150, a user associated with the spatial computing device 150, as well as biometric or other authentication data captured by the spatial computing device 150 (e.g., retina or iris scan data of the user wearing the spatial computing device 150 may be captured and transmitted with the indication).

As indicated herein, in some examples, the spatial computing event processing computing platform 110 may be part of a same device as spatial computing device 150 or may be a different device in communication with spatial computing device 150. Aspects described as performed by the spatial computing event processing computing platform 110 may be performed by the spatial computing device 150 and vice versa in some examples.

At step 205, in response to receiving the indication of a detection of the point-of-sale system 140 (e.g., which may indicate a request to process an event may be forthcoming), spatial computing event processing computing platform 110 may establish a connection with internal entity computing system 120. For instance, spatial computing event processing computing platform 110 may establish a second wireless connection with internal entity computing system 120. Upon establishing the second wireless connection, a communication session may be initiated between spatial computing event processing computing platform 110 and internal entity computing system 120.

Figure 2B:
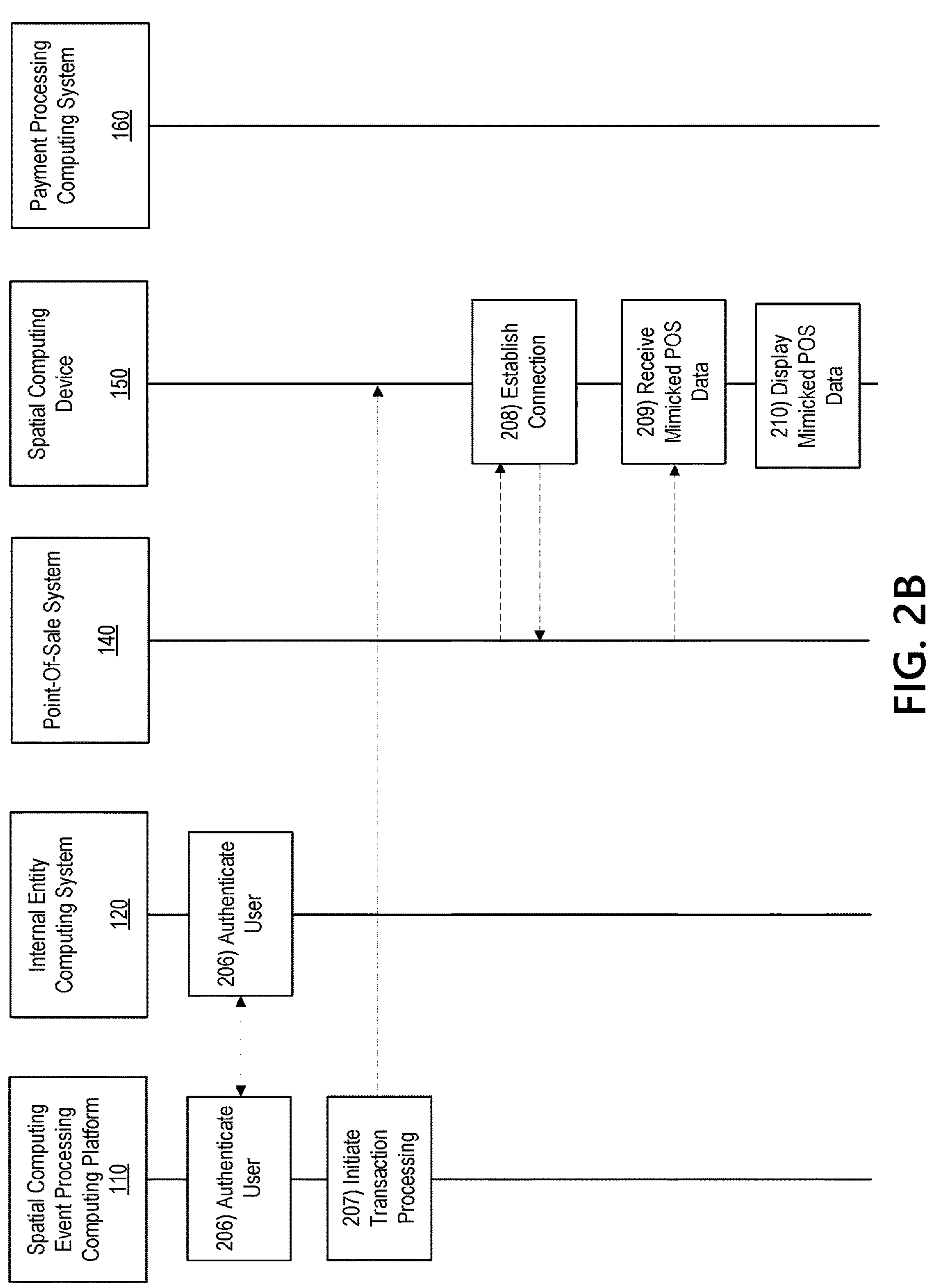

With reference to FIG. 2B, at step 206, spatial computing event processing computing platform 110 and internal entity computing system 120 may authenticate the user associated with the spatial computing device 150. For instance, based on the indication of detection of the point-of-sale system 140, spatial computing event processing computing platform 110 may retrieve, from internal entity computing system 120, pre-stored authentication data associated with the user, such as pre-stored biometric data. The pre-stored biometric data may be compared to the biometric data received with the indication to determine whether the user is authenticated.

If the authentication data matches, the user may be authenticated and the process may continue. If the user is not authenticated, the process may end.

At step 207, spatial computing event processing computing platform 110 may initiate transaction processing. For instance, spatial computing event processing computing platform 110 may transmit or send a signal to the spatial computing device 150 that the device/user is authenticate and transaction or event processing may continue.

At step 208, in response to the initiation of the transaction processing, spatial computing device 150 may establish a connection with point-of-sale system 140. For instance, spatial computing device 150 may establish a third wireless connection with point-of-sale system 140. Upon establishing the third wireless connection, a communication session may be initiated between spatial computing device 150 and point-of-sale system 140. In some examples, the third wireless connection may be established via near-field communication or other short-range communication protocol. Further, in some examples, the third wireless connection (e.g., a near-field communication connection between spatial computing device 150 and point-of-sale system 140) may be continuously maintained until completion of the event or transaction processing.

At step 209, spatial computing device 150 may receive mimicked point-of-sale device data from the point-of-sale system 140. For instance, the point-of-sale system 140 may display, in a display of a point-of-sale device of the point-of-sale system in communication with the spatial computing device, an invoice, list of items purchased, amount of each purchase, or the like. The displayed purchase or invoice data may be transmitted to the spatial computing device 150 and mimicked on the display of the spatial computing device 150.

Figure 5:
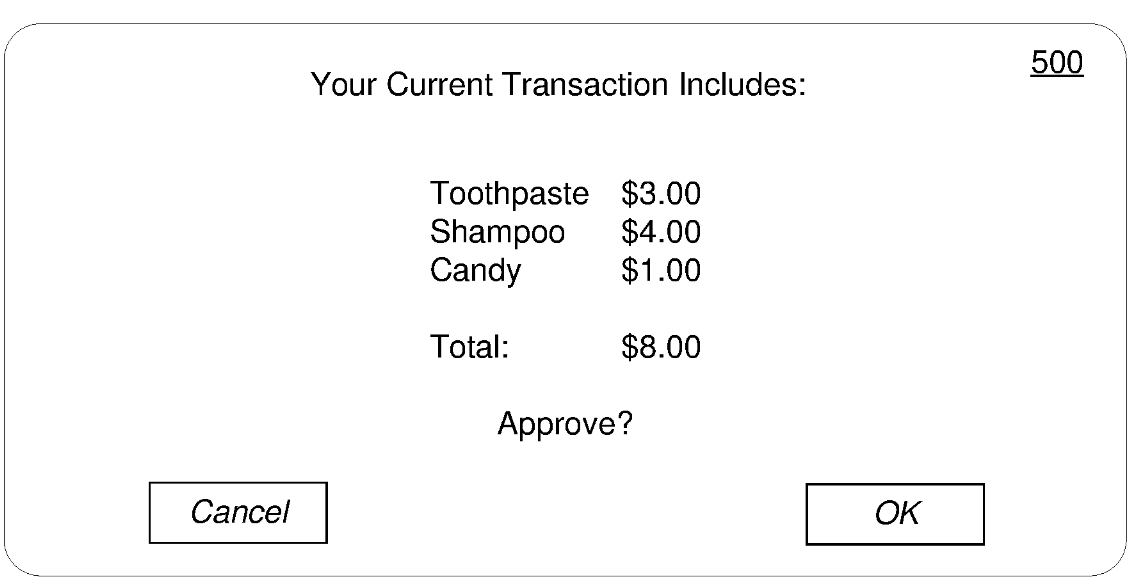

At step 210, the mimicked point-of-sale system 140 data (e.g., purchase data, invoice data, or the like) may be displayed by display of the spatial computing device 150 to enable the user to interact with the data via the spatial computing device 150. In some examples, the mimicked data may be enhanced with other virtual data that may enable removal of an item from the list, selection of one or more options (e.g., split payment, or the like), and the like. FIG. 5 illustrates one example interface 500 that may be displayed by the display of the spatial computing device 150. The interface 500 includes a listing of the items being purchased, as mimicked from the point-of-sale system 140, as well as a total for the transaction. The interface 500 may also include a request to approve processing the transaction. The approval may, in some examples, require user input (e.g., gesture data or other input) to select "OK" or "Cancel" or otherwise approve or reject the transaction.

Figure 2C:
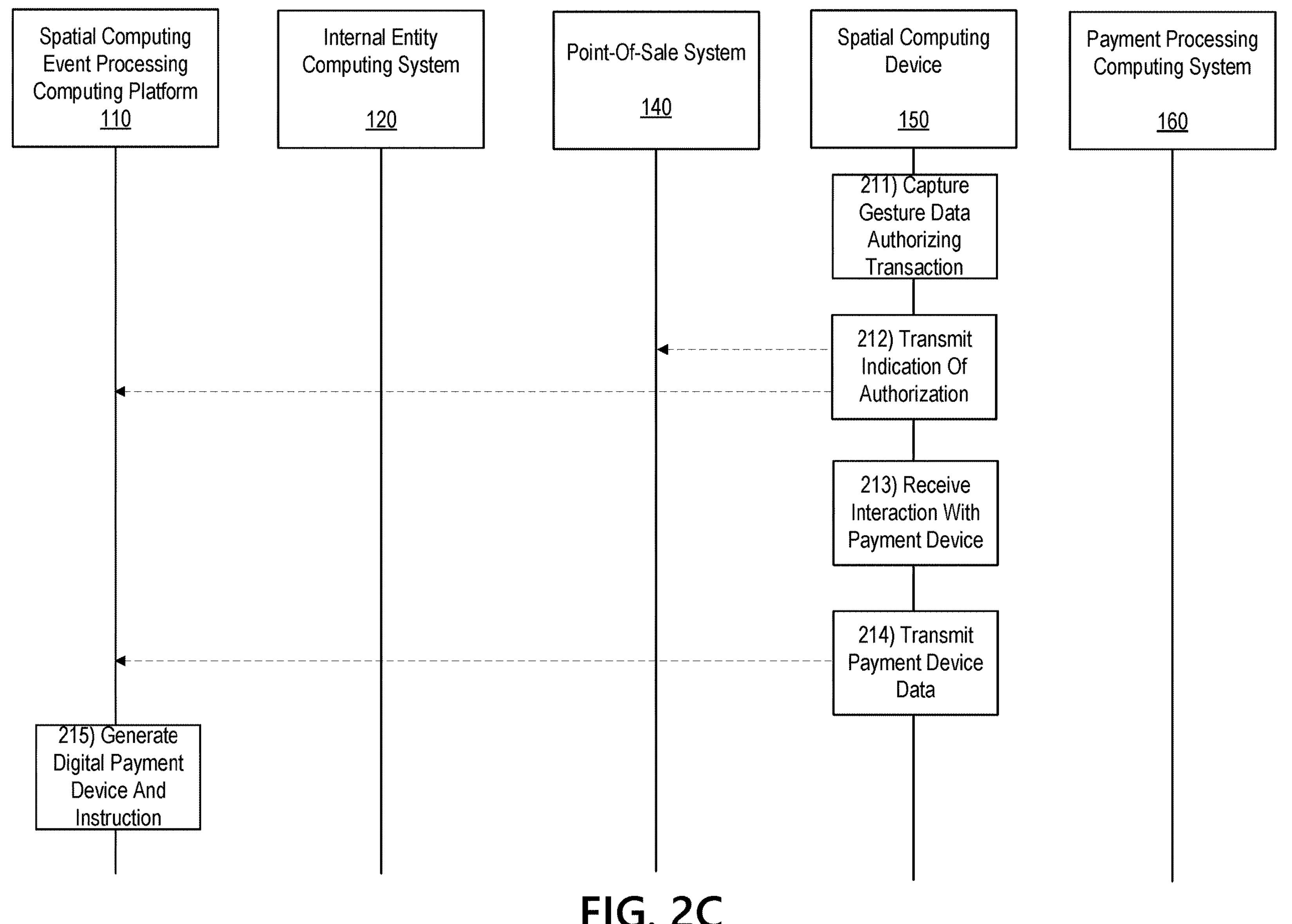

With reference to FIG. 2C, at step 211, the spatial computing device 150 may capture data indicating selection of one or more options. For instance, spatial computing device 150 may capture gesture or other data or inputs provided by the user to indicate approval of the mimicked invoice or purchase data displayed by the display of the spatial computing device 150.

At step 212, spatial computing device 150 may transmit or send the indication of approval to the point-of-sale system 140 (e.g., the continuously maintained near-field communication connection) and, in some examples, the spatial computing event processing computing platform 110.

At step 213, spatial computing device 150 may receive interaction with one or more payment card devices of the user. For instance, spatial computing device 150 may detect (e.g., via radio frequency identification, near-field communication, or the like) a payment card device having an embedded chip to enable tap to pay functionality within proximity of the spatial computing device 150. In some examples, the payment card device may be a standard size and shaped credit or debit card including a chip embedded on a surface of the payment card device.

In examples in which a user has approved the payment, one payment card device may be detected by the spatial computing device 150. Additionally or alternatively, a user may "tap" a plurality of payment card devices and each payment card device may be used to pay or process a portion of the transaction. For instance, a user may "tap" more than one payment card device which may indicate a desire by the user to split the transaction between the payment card devices detected.

At step 214, spatial computing device 150 may extract payment card device details from each of the one or more physical payment card devices detected (e.g., account number, user name, expiration date, CVV, or the like) and may transmit the payment card device details to the spatial computing event processing computing platform 110.

At step 215, spatial computing event processing computing platform 110 may receive the extracted payment card device details and generate a digital payment card or device representative of each payment card device detected or for which payment card device details were received. In some examples, the generated digital payment device or card may be valid or available for use for a predetermined time. For instance, a generated digital payment device or card may expire after a time period has elapsed, after a predetermined number of uses, or the like. For example, a generated digital payment device or card may be valid for use for one hour, one day, 1 transaction, 3 transactions, or the like. In some examples, the period of validity of the digital payment device or card may be customizable by the user, the enterprise organization, or the like. Further, spatial computing event processing computing platform 110 may generate an instruction causing the digital payment options to be displayed by a display of the spatial computing device.

Figure 2D:
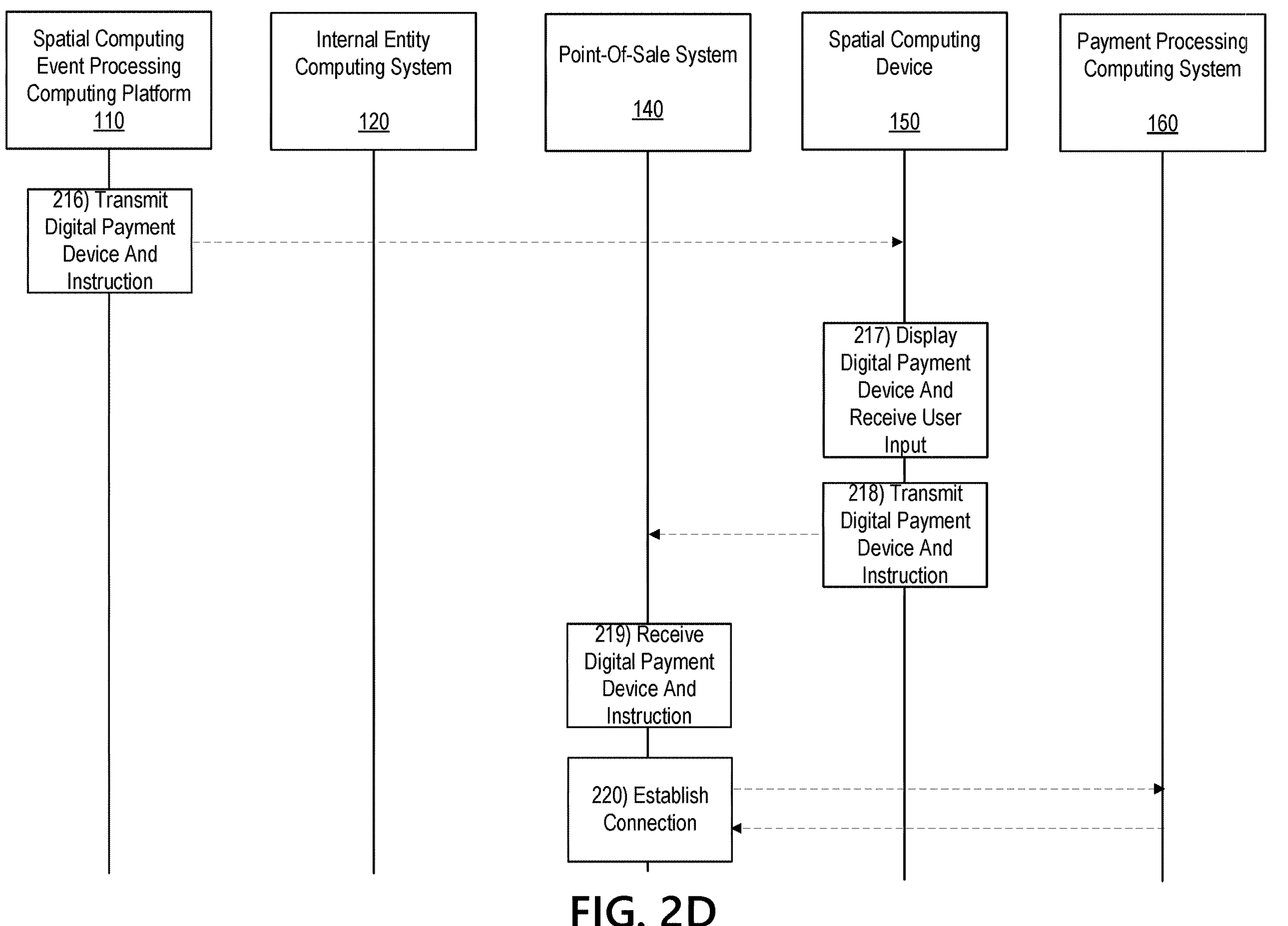

With reference to FIG. 2D, at step 216, spatial computing event processing computing platform 110 may transmit or send the digital payment device(s) generated at step 215, and the instruction causing the digital payment device(s) to be displayed by a display of the spatial computing device.

Figure 6:
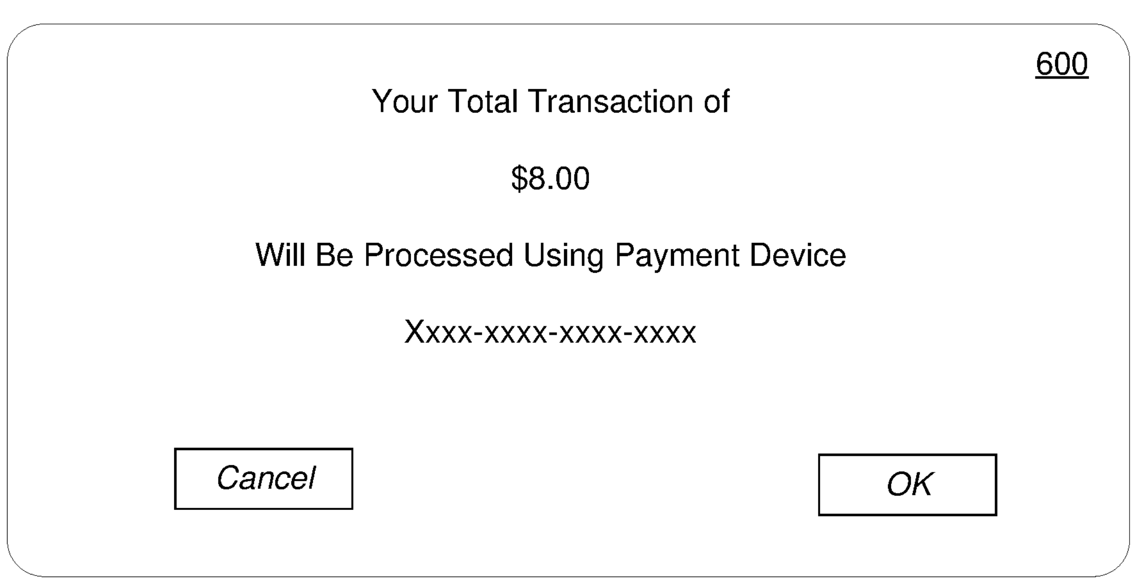

At step 217, spatial computing device 150 may display the generated digital payment device(s) and may receive user input (e.g., gesture or other user input) providing parameters for processing the transaction. For instance, if a single payment card device is being used, details of the digital payment device or card corresponding to the single payment card device may be displayed and a request for approval may be displayed. The user may provide a gesture or other input captured by the spatial computing device to proceed with transaction processing. FIG. 6 illustrates one example user interface 600 that may be displayed by the display of the spatial computing device. The interface 600 includes identification of payment card device being used. In some examples, the interface may request user input to approve or confirm use of the card. For instance, the user may provide input (e.g., via gesture or other input) selecting to approve or confirm use of the identified or displayed payment card device. In some examples, the display may include an image of the physical payment card device for ease of identification.

Additionally or alternatively, if more than one payment card device is being used to process the transaction, details of each digital payment device or card corresponding to each physical payment card device detected by the spatial computing device 150 may be displayed. In some examples, options for the user to identify a portion of the transaction to process with each digital payment device or card, particular items to pay for with a particular digital payment device or card, or the like, may be provided. FIG. 7 illustrates one example user interface 700 displaying a plurality of digital payment devices or cards and options associated therewith. For instance, the interface identifies the items in the transaction and includes identification of an option for which payment card device of the plurality of payment card devices to use for each item purchased. The interface 700 may further include an indication of a total being charged to each payment card device, as well as options to approve or modify the selections made.

Once user input is received by the spatial computing device 150 to proceed with processing the transaction, spatial computing device 150 may transmit or send, to the point-of-sale system 140 (e.g., via the continuous near-field communication connection) instructions to process the transaction using the one or more digital payment devices or cards at step 218. For instance, spatial computing device 150 may transmit or send the digital payment device(s), as well as any additional information (e.g., items to purchase or portion to process with each digital payment device, or the like) to the point-of-sale system 140 for processing.

At step 219, point-of-sale system 140 may receive the digital payment device(s) and instructions to process the transaction. In response, at step 220, point-of-sale system 140 may establish a connection with payment processing computing system 160. For instance, point-of-sale system 140 may establish a fourth wireless connection with payment processing computing system 160. Upon establishing the fourth wireless connection, a communication session may be initiated between point-of-sale system 140 and payment processing computing system 160.

Figure 2E:
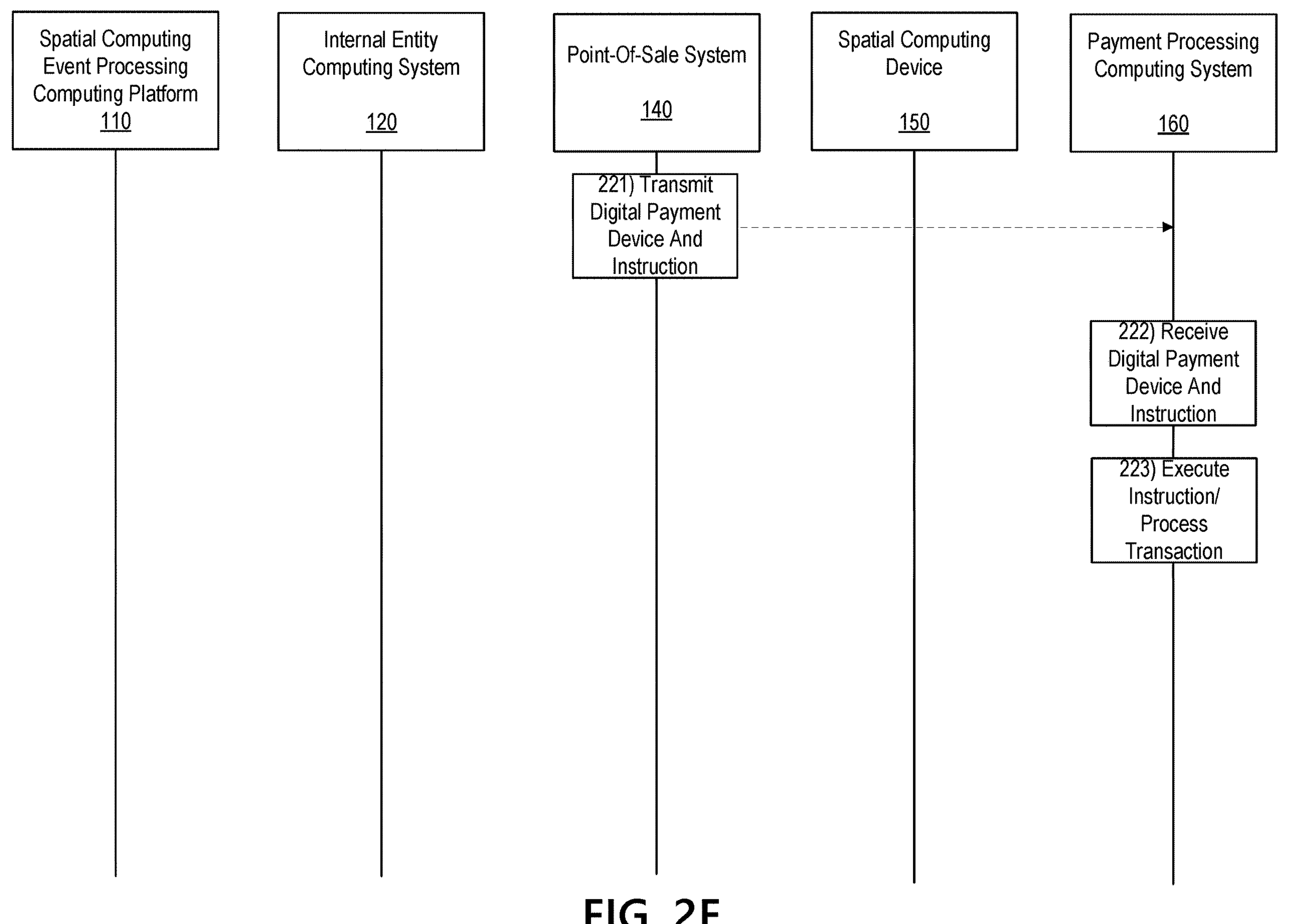

With reference to FIG. 2E, at step 221, the point-of-sale system may transmit or send the digital payment device(s) and instructions to process the transaction to the payment processing computing system 160. Although only one payment processing computing system 160 is shown, in some examples, digital payment device(s) and/or instructions may be transmitted to more than one payment processing computing system 160 (e.g., payment processing systems associated with each entity associated with a respective payment card device).

At step 222, payment processing computing system 160 may receive the digital payment device(s) and instruction. At step 223, payment processing computing system 160 may process the transaction. In some examples, processing the transaction may cause the payment processing computing system 160 to communicate transaction details to internal entity computing system 120 to update one or more account ledgers associated with the account of the user, or the like.

Figure 3:
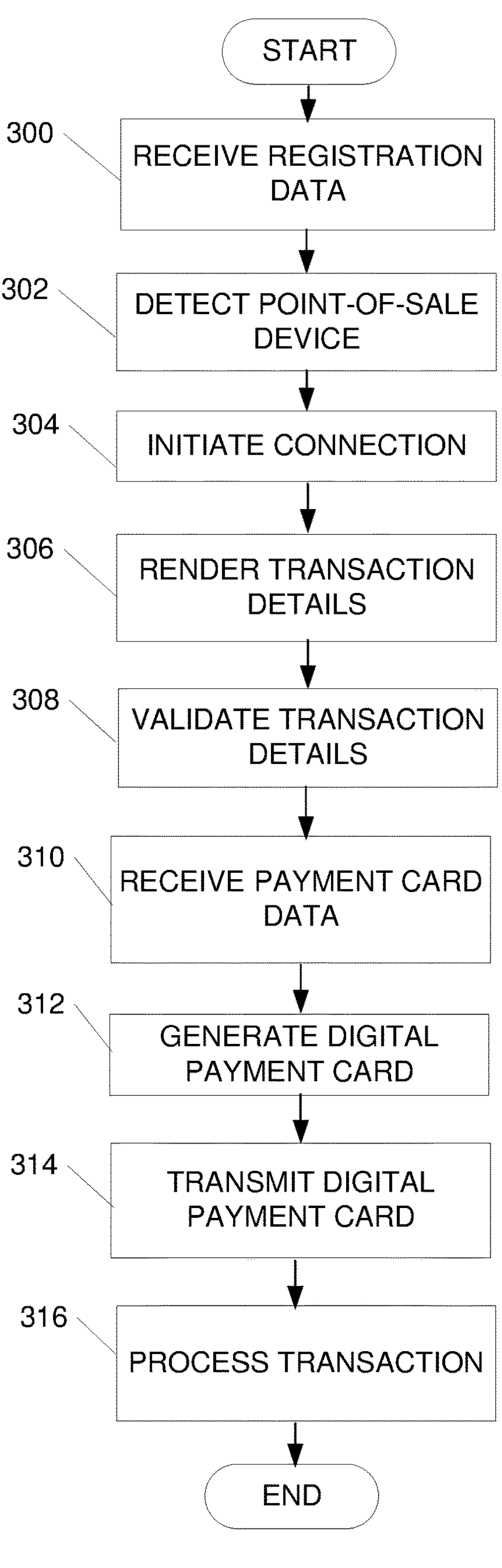
FIG. 3 depicts an illustrative method for leveraging spatial computing to provide secure point-of-sale interaction in accordance with one or more aspects described herein.

FIG. 3 is a flow chart illustrating one example method of leveraging spatial computing for secure point-of-sale device interaction in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform, such as spatial computing event processing computing platform 110, may receive, registration data identifying one or more users, spatial computing devices, and the like. The registration data may include user authentication data such as username and password, biometric data, and the like.

At step 302, the computing platform may detect a point-of-sale system 140. For instance, based on proximity of a spatial computing device 150 to the point-of-sale system 140 (e.g., the spatial computing device 150 is within a predefined range or distance of the point-of-sale system 140), the computing platform may detect the point-of-sale system 140. In some examples, detecting the point-of-sale system may include receiving an indication, from the spatial computing device 150, that the point-of-sale system 140 was detected.

At step 304, the computing platform (e.g., via spatial computing device 150) may initiate a connection and communication session between the spatial computing device 150 and the point-of-sale system 140. For instance, the computing platform 110 may transmit an instruction or command causing the spatial computing device 150 to initiate a communication session with the point-of-sale system 140. In some examples, the connection may be via near-field communication. In some arrangements, the near-field communication connection between the spatial computing device 150 and the point-of-sale system 140 may be continuously maintained until completion of processing of a transaction with a payment processing entity.

At step 306, transaction details of a transaction being processed by the point-of-sale system 140 and for a user of the spatial computing device 150 may be rendered by a display of the spatial computing device 150. For instance, an invoice, list of items being purchased, cost of each item, total amount of purchase, and the like, may be rendered by a display of the spatial computing device 150. In some examples, the transaction details may be data mimicked from the point-of-sale system 140.

At step 308, the computing platform 110 may validate or approve the transaction via one or more user inputs captured by the spatial computing device 150. For instance, user gestures or other inputs may be captured by the spatial computing device 150. The user gestures or other inputs may indicate approval of the transaction details mimicked by the display of the spatial computing device 150 and may be received by the computing platform 110.

At step 310, the computing platform may receive payment card device data via the spatial computing device 150. For instance, the user may tap a payment card device (e.g., a physical payment card device such as a debit or credit card having a chip embedded into the payment card device) to the spatial computing device 150. Wireless connection, such as radio frequency identification, near-field communication, or the like, may enable the spatial computing device 150 to receive payment card device data and the payment card device data may be transmitted to and received by the computing platform 110. The payment card device data may include account number, expiration date, and the like.

At step 312, the computing platform may generate a digital payment device or card based on the payment card device information captured from the user payment card device.

At step 314, computing platform 110 may transmit the digital payment device or card to the point-of-sale system 140. In some examples, the digital payment device or card may be transmitted by the computing platform 110, to the spatial computing device 150 and from the spatial computing device 150 to the point-of-sale system 140 (e.g., via the near-field communication session). Transmitting the digital payment device may cause the point-of-sale system to process the transaction with a payment processing entity using the digital payment device at step 316.

Figure 4:
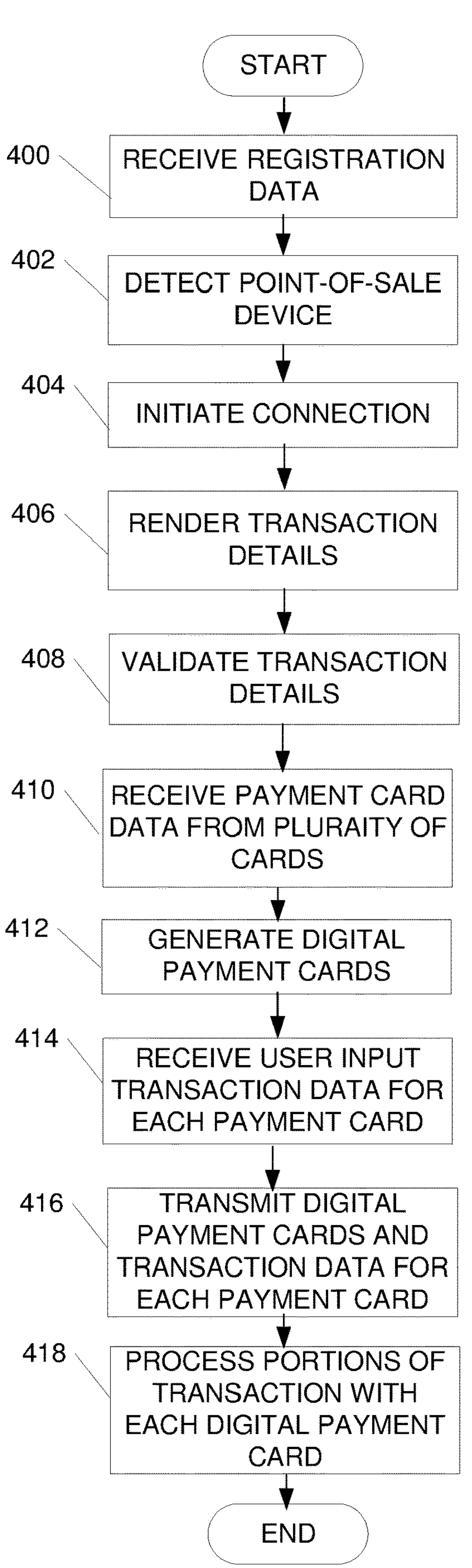
FIG. 4 depicts an illustrative method for leveraging spatial computing to provide secure multi-event point-of-sale interaction in accordance with one or more aspects described herein.

FIG. 4 is a flow chart illustrating one example method of leveraging spatial computing for secure multi-event point-of-sale device interaction in accordance with one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, a computing platform, such as spatial computing event processing computing platform 110, may receive, registration data identifying one or more users, spatial computing devices, and the like. The registration data may include user authentication data such as username and password, biometric data, and the like.

At step 402, the computing platform may detect a point-of-sale system 140. For instance, based on proximity of a spatial computing device 150 to the point-of-sale system 140 (e.g., the spatial computing device 150 is within a predefined range or distance of the point-of-sale system 140), the computing platform may detect the point-of-sale system 140. In some examples, detecting the point-of-sale system may include receiving an indication, from the spatial computing device 150, that the point-of-sale system 140 was detected.

At step 404, the computing platform (e.g., via spatial computing device 150) may initiate a connection and communication session between the spatial computing device 150 and the point-of-sale system 140. For instance, the computing platform 110 may transmit an instruction or command causing the spatial computing device 150 to initiate a communication session with the point-of-sale system 140. In some examples, the connection may be via near-field communication. In some arrangements, the near-field communication connection between the spatial computing device 150 and the point-of-sale system 140 may be continuously maintained until completion of processing of a transaction with a payment processing entity.

At step 406, transaction details of a transaction being processed by the point-of-sale system 140 and for a user of the spatial computing device 150 may be rendered by a display of the spatial computing device 150. For instance, an invoice, list of items being purchased, cost of each item, total amount of purchase, and the like, may be rendered by a display of the spatial computing device 150. In some examples, the transaction details may be data mimicked from the point-of-sale system 140.

At step 408, the computing platform 110 may validate or approve the transaction via one or more user inputs captured by the spatial computing device 150. For instance, user gestures or other inputs may be captured by the spatial computing device 150. The user gestures or other inputs may indicate approval of the transaction details mimicked by the display of the spatial computing device 150 and may be received by the computing platform 110.

At step 410, the computing platform may receive payment card device data associated with a plurality of payment card devices via the spatial computing device 150. For instance, the user may tap a plurality of payment card devices (e.g., physical payment card devices such as a debit or credit card having a chip embedded into the payment card device) to the spatial computing device 150. Wireless connection, such as radio frequency identification, near-field communication, or the like, may enable the spatial computing device 150 to receive payment card device data from the plurality of payment card devices and the payment card device data may be transmitted to and received by the computing platform 110. The payment card device data may include account number, expiration date, and the like for each payment card device of the plurality of payment card devices.

At step 412, the computing platform may generate, based on the received payment card device data from each payment card device of the plurality of payment card devices, a digital payment card corresponding to each payment card device of the plurality of payment card devices. For instance, for each payment card device tapped to the spatial computing device 150, a digital payment card may be generated based on the payment card device details of the corresponding physical payment card device.

At step 414, user input identifying a portion of the transaction to be processed using each payment card device of the plurality of payment card devices may be received. For instance, user gestures may be used to identify items displayed on the spatial computing device for purchase with each payment card device of the plurality of payment card devices, a percent of a total amount of the transaction to be processing with each payment card device of the plurality of payment card devices, or the like.

At step 416, computing platform 110 may transmit the plurality of digital payment cards corresponding to each physical payment card device of the plurality of payment card devices to the point-of-sale system 140, as well as the portion of the transaction to be processed with each payment card device of the plurality of payment card devices. In some examples, each digital payment card may be transmitted by the computing platform 110, to the spatial computing device 150 and from the spatial computing device 150 to the point-of-sale system 140 (e.g., via the near-field communication session). Transmitting the plurality of digital payment cards may cause the point-of-sale system to process each portion of the transaction with a payment processing entity associated with each respective payment card device and using the corresponding digital payment card at step 418.

Accordingly, aspects described herein enable secure interaction between a user payment card device, such as a debit card or credit card, and a point-of-sale device by eliminating the direct interaction (e.g., swipe, tap, insert) between the payment card device and the point-of-sale device and, instead, using the user's spatial computing device to directly interact with the payment card device (e.g., via tap to pay). Be reducing or eliminating direct interaction or contact with the point-of-sale device, the arrangements described herein reduce or eliminate the potential for unauthorized actors to obtain, without permission, user data or payment card data via a compromised point-of-sale device.

While aspects described herein include use of a spatial computing device, in some examples, other types of near-field communication enabled computing devices of users may be used without departing from the invention.

As discussed herein, spatial computing devices may include device that combine both the physical world and virtual world or virtual aspects. A spatial computing device may be enabled to sense telemetry on the x, y and z axes, whether in a virtual world of physical world or space. Further, spatial computing devices may capture or provide geo-location data of the device (e.g., geographic coordinates of the spatial computing device). In some examples, the geo-location data may be further used in approving transactions, detecting potential unauthorized activity, and the like.

For instance, if unauthorized activity is detected after the transaction is processed, a record or audit trail of the physical location of the spatial computing device used to process the transaction may be retrieved and used to investigate the unauthorized activity, or the like.

Further, in some examples, geo-location data from previous occurrences of unauthorized activity may be compared to a current geo-location of the spatial computing device and a notice or alert may be generated or transmitted to the spatial computing device that unauthorized activity had previously occurred in that area, at that point-of-sale device, or the like. For instance, historical data related to a particular point-of-sale device, retailer, or the like, may be evaluated to identify potential issues and alerts or notifications may be transmitted to the spatial computing device. In some examples, alert information may be transmitted or communicated to others users having spatial computing devices, to other devices paired to the spatial computing device, to other devices within a predefined range or distance, or the like. In arrangements in which the notifications or alerts are transmitted to other users having spatial computing devices, images of the point-of-sale device, retail location, or the like, may also be transmitted for display by a display of the other spatial computing devices to aid in identifying potential suspicious or compromised point-of-sale devices.

Although aspects described herein are directed to a user tapping one or more payment card devices to the spatial computing device while at the point-of-sale device location, in some examples, the user may tap the payment card device(s) in advance of entering the retail location (e.g., from home, work, or the like) in order to generate the digital payment devices or cards. The digital payment devices or cards may be available for use for a predetermined time period (e.g., one hour, four hours, one day, or the like) and the user may process one or more transactions using the digital payment cards or devices without requiring the physical payment card device to be present.

In some examples, machine learning or other intelligence may be used to evaluate split transactions and/or recommend split transactions. For instance, if a user has three payment card devices and one includes higher rewards for a particular item being purchased, the system may recommend purchasing at least that item with the payment card device associated with the higher reward. In another example, if a user is making a purchase totaling $1000 and one card has capacity to charge $400 and another card has capacity to charge $600, the system may generate a recommendation to split the transaction according to the available funds. For instance, the computing platform may confirm availability of funds prior to processing a transaction or to proactively provide a recommendation for which payment card device(s) to use.

Accordingly, the arrangements described herein provide increased security for users processing transactions via point-of-sale devices.

Figure 8:
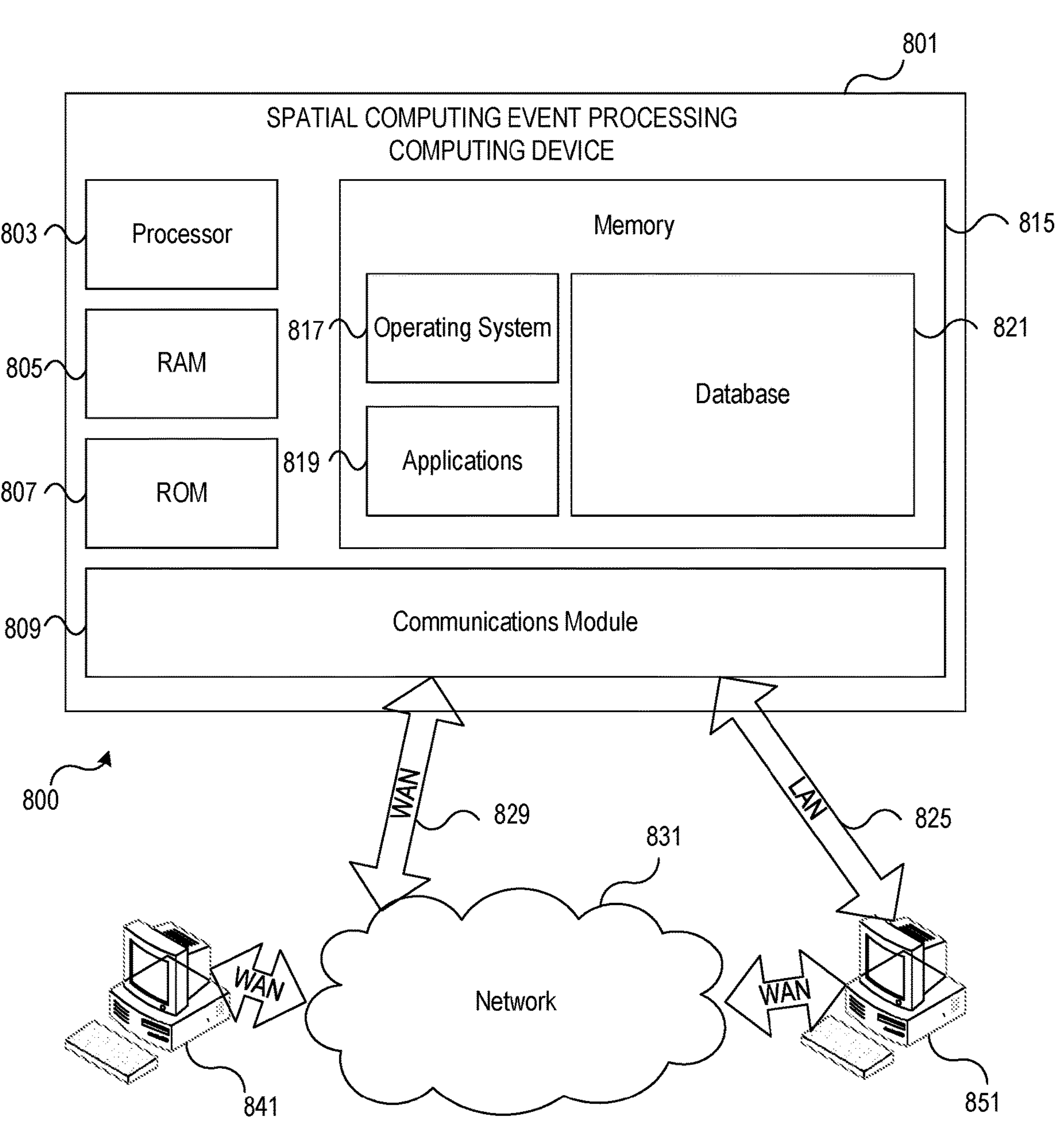
FIG. 8 illustrates one example environment in which various aspects of the disclosure may be implemented in accordance with one or more aspects described herein.

FIG. 8 depicts an illustrative operating environment in which various aspects of the present disclosure may be implemented in accordance with one or more example embodiments. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include spatial computing event processing computing device 801 having processor 803 for controlling overall operation of spatial computing event processing computing device 801 and its associated components, including Random Access Memory (RAM) 805, Read-Only Memory (ROM) 807, communications module 809, and memory 815. Spatial computing event processing computing device 801 may include a variety of computer readable media. Computer readable media may be any available media that may be accessed by spatial computing event processing computing device 801, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by spatial computing event processing computing device 801.

Although not required, various aspects described herein may be embodied as a method, a data transfer system, or as a computer-readable medium storing computer-executable instructions. For example, a computer-readable medium storing instructions to cause a hardware processor to perform steps of a method in accordance with aspects of the disclosed embodiments is contemplated. For example, aspects of method steps disclosed herein may be executed on a processor on spatial computing event processing computing device 801. Such a processor may execute computer-executable instructions stored on a computer-readable medium.

Software may be stored within memory 815 and/or storage to provide instructions to processor 803 for enabling spatial computing event processing computing device 801 to perform various functions as discussed herein. For example, memory 815 may store software used by spatial computing event processing computing device 801, such as operating system 817, application programs 819, and associated database 821. Also, some or all of the computer executable instructions for spatial computing event processing computing device 801 may be embodied in hardware or firmware. Although not shown, RAM 805 may include one or more applications representing the application data stored in RAM 805 while spatial computing event processing computing device 801 is on and corresponding software applications (e.g., software tasks) are running on spatial computing event processing computing device 801.

Communications module 809 may include a microphone, keypad, touch screen, and/or stylus through which a user of spatial computing event processing computing device 801 may provide input, and may also include one or more of a speaker for providing audio output and a video display device for providing textual, audiovisual and/or graphical output. Computing system environment 800 may also include optical scanners (not shown).

Spatial computing event processing computing device 801 may operate in a networked environment supporting connections to one or more other computing devices, such as computing device 841 and 851. Computing devices 841 and 851 may be personal computing devices or servers that include any or all of the elements described above relative to spatial computing event processing computing device 801.

The network connections depicted in FIG. 8 may include Local Area Network (LAN) 825 and Wide Area Network (WAN) 829, as well as other networks. When used in a LAN networking environment, spatial computing event processing computing device 801 may be connected to LAN 825 through a network interface or adapter in communications module 809. When used in a WAN networking environment, spatial computing event processing computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:

at least one processor;

a communication interface communicatively coupled to the at least one processor; and a memory storing computer-readable instructions that, when executed by the at least one processor, cause the computing platform to:

receive, from a spatial computing device within a predefined distance of a point-of-sale device, detection of the point-of-sale device;

initiate a connection between the spatial computing device and the point-of-sale device;

render, by a display of the spatial computing device, transaction details associated with a transaction, wherein the transaction details include data mimicked from the point-of-sale device;

receive, from the spatial computing device, first user input captured by the spatial computing device approving the transaction details;

receive, from the spatial computing device and based on wireless communication between the spatial computing device and a plurality of physical payment card devices, payment card device data from each physical payment card device of the plurality of physical payment card devices;

generate, based on the received payment card device data from each physical payment card device of the plurality of physical payment card devices, a digital payment card including a digital rendering corresponding to each physical payment card device of the plurality of physical payment card devices, wherein the digital rendering includes an image of each physical payment card device;

receive, from the spatial computing device, second user input identifying a portion of the transaction to be processed with each digital payment card corresponding to each physical payment card device of the plurality of physical payment card devices; and transmit, to the point-of-sale device, the digital payment card corresponding to each physical payment card device of the plurality of physical payment card devices and the portion of the transaction to be processed with each digital payment card corresponding to each physical payment card device of the plurality of physical payment card devices, wherein transmitting the digital payment card corresponding to each physical payment card device of the plurality of physical payment card devices and the portion of the transaction to be processed with each digital payment card corresponding to each physical payment card device of the plurality of physical payment card devices causes the point-of-sale device to process each portion of the transaction with a payment processing entity associated with each respective physical payment card device.

2. The computing platform of claim 1, wherein each physical payment card device is associated with a different payment processing entity.

3. The computing platform of claim 1, wherein the second user input identifying the portion of the transaction to be processed with each digital payment card corresponding to each physical payment card device of the plurality of physical payment card devices includes identification of an item to be purchased with each digital payment card corresponding to each physical payment card device of the plurality of physical payment card devices.

4. The computing platform of claim 1, wherein the second user input identifying the portion of the transaction to be processed with each digital payment card corresponding to each physical payment card device of the plurality of physical payment card devices includes identification of a percent of an amount of the transaction to be processed with each digital payment card corresponding to each physical payment card device of the plurality of physical payment card devices.

5. The computing platform of claim 1, wherein the first user input and the second user input include gestures captured by the spatial computing device.

6. The computing platform of claim 1, wherein the connection between the spatial computing device and the point-of-sale device includes a near-field communication connection.

7. The computing platform of claim 6, wherein the near-field communication connection is continuously maintained until completion of the processing of each portion of the transaction with a respective payment processing entity.

8. A method, comprising:

receiving, by a computing platform, the computing platform having at least one processor and memory, and from a spatial computing device within a predefined distance of a point-of-sale device, detection of the point-of-sale device;

initiating, by the at least one processor, a connection between the spatial computing device and the point-of-sale device;

rendering, by the at least one processor and via a display of the spatial computing device, transaction details associated with a transaction, wherein the transaction details include data mimicked from the point-of-sale device;

receiving, by the at least one processor and from the spatial computing device, first user input captured by the spatial computing device approving the transaction details;

receiving, by the at least one processor and from the spatial computing device and based on wireless communication between the spatial computing device and a plurality of physical payment card devices, payment card device data from each payment card device of the plurality of physical payment card devices;

generating, by the at least one processor and based on the received payment card device data from each physical payment card device of the plurality of physical payment card devices, a digital payment card including a digital rendering corresponding to each physical payment card device of the plurality of physical payment card devices, wherein the digital rendering includes an image of each physical payment card device;

receiving, by the at least one processor and from the spatial computing device, second user input identifying a portion of the transaction to be processed with each digital payment card corresponding to each physical payment card device of the plurality of physical payment card devices; and transmitting, by the at least one processor and to the point-of-sale device, the digital payment card corresponding to each physical payment card device of the plurality of physical payment card devices and the portion of the transaction to be processed with each digital payment card corresponding to each physical payment card device of the plurality of physical payment card devices, wherein transmitting the digital payment card corresponding to each physical payment card device of the plurality of physical payment card devices and the portion of the transaction to be processed with each digital payment card corresponding to each physical payment card device of the plurality of physical payment card devices causes the point-of-sale device to process each portion of the transaction with a payment processing entity associated with each respective physical payment card device.

9. The method of claim 8, wherein each physical payment card device is associated with a different payment processing entity.

10. The method of claim 8, wherein the second user input identifying the portion of the transaction to be processed with each digital card corresponding to each physical payment card device of the plurality of physical payment card devices includes identification of an item to be purchased with each digital payment card corresponding to each physical payment card device of the plurality of physical payment card devices.

11. The method of claim 8, wherein the second user input identifying the portion of the transaction to be processed with each digital payment card corresponding to each physical payment card device of the plurality of physical payment card devices includes identification of a percent of an amount of the transaction to be processed with each digital payment card corresponding to each physical payment card device of the plurality of physical payment card devices.

12. The method of claim 8, wherein the first user input and the second user input include gestures captured by the spatial computing device.

13. The method of claim 8, wherein the connection between the spatial computing device and the point-of-sale device includes a near-field communication connection.

14. The method of claim 13, wherein the near-field communication connection is continuously maintained until completion of the processing of each portion of the transaction with a respective payment processing entity.

15. One or more non-transitory computer-readable media storing instructions that, when executed by a computing platform comprising at least one processor, memory, and a communication interface, cause the computing platform to:

receive, from a spatial computing device within a predefined distance of a point-of-sale device, detection of the point-of-sale device;

initiate a connection between the spatial computing device and the point-of-sale device;

render, by a display of the spatial computing device, transaction details associated with a transaction, wherein the transaction details include data mimicked from the point-of-sale device;

receive, from the spatial computing device, first user input captured by the spatial computing device approving the transaction details;

receive, from the spatial computing device and based on wireless communication between the spatial computing device and a plurality of physical payment card devices, payment card device data from each physical payment card device of the plurality of physical payment card devices;

generate, based on the received payment card device data from each physical payment card device of the plurality of physical payment card devices, a digital payment card corresponding to each physical payment card device of the plurality of physical payment card devices, wherein the digital rendering includes an image of each physical payment card device;

receive, from the spatial computing device, second user input identifying a portion of the transaction to be processed with each digital payment card corresponding to each physical payment card device of the plurality of physical payment card devices; and transmit, to the point-of-sale device, the digital payment card corresponding to each physical payment card device of the plurality of physical payment card devices and the portion of the transaction to be processed with each digital payment card corresponding to each physical payment card device of the plurality of physical payment card devices, wherein transmitting the digital payment card corresponding to each physical payment card device of the plurality of physical payment card devices and the portion of the transaction to be processed with each digital payment card corresponding to each physical payment card device of the plurality of physical payment card devices causes the point-of-sale device to process each portion of the transaction with a payment processing entity associated with each respective physical payment card device.

16. The one or more non-transitory computer-readable media of claim 15, wherein each physical payment card device is associated with a different payment processing entity.

17. The one or more non-transitory computer-readable media of claim 15, wherein the second user input identifying the portion of the transaction to be processed with digital payment card corresponding to each physical payment card device of the plurality of physical payment card devices includes identification of an item to be purchased with each digital payment card corresponding to each physical payment card device of the plurality of physical payment card devices.

18. The one or more non-transitory computer-readable media of claim 15, wherein the second user input identifying the portion of the transaction to be processed with each digital payment card corresponding to each physical payment card device of the plurality of physical payment card devices includes identification of a percent of an amount of the transaction to be processed with each digital payment card corresponding to each physical payment card device of the plurality of physical payment card devices.

19. The one or more non-transitory computer-readable media of claim 15, wherein the connection between the spatial computing device and the point-of-sale device includes a near-field communication connection.

20. The one or more non-transitory computer-readable media of claim 19, wherein the near-field communication connection is continuously maintained until completion of the processing of each portion of the transaction with a respective payment processing entity.

* * * * *